US012042029B2

(12) United States Patent
Mahler et al.

(10) Patent No.: US 12,042,029 B2
(45) Date of Patent: Jul. 23, 2024

(54) WATCH WITH REMOVABLE HORNS

(71) Applicant: ETA SA Manufacture Horlogère Suisse, Grenchen (CH)

(72) Inventors: Olivier Mahler, Fontaines (CH); Patrick Cano, Courrendlin (CH); David Benjamin Kraehenbuehl, Bettlach (CH); Roger Muller, Kirchberg (CH)

(73) Assignee: ETA SA MANUFACTURE HORLOGÈRE SUISSE, Grenchen (CH)

(*) Notice: Subject to any disclaimer, the term of this patent is extended or adjusted under 35 U.S.C. 154(b) by 444 days.

(21) Appl. No.: 17/480,795

(22) Filed: Sep. 21, 2021

(65) Prior Publication Data

US 2022/0104591 A1 Apr. 7, 2022

(30) Foreign Application Priority Data

Oct. 6, 2020 (EP) .................................... 20000361

(51) Int. Cl.
*A44C 5/14* (2006.01)
*G04B 37/14* (2006.01)

(52) U.S. Cl.
CPC ............ *A44C 5/14* (2013.01); *G04B 37/1486* (2013.01)

(58) Field of Classification Search
CPC ...................................................... G04B 37/16
See application file for complete search history.

(56) References Cited

U.S. PATENT DOCUMENTS

| | | | | |
|---|---|---|---|---|
| 11,166,529 B2 * | 11/2021 | Cuenat | A44C 5/147 |
| 2019/0174882 A1 | 6/2019 | Cuenat et al. | |

FOREIGN PATENT DOCUMENTS

| | | | |
|---|---|---|---|
| CH | 701 221 A1 | 12/2010 | |
| CH | 712115 A2 * | 8/2017 | G04B 37/0427 |
| CH | 715 154 A1 | 1/2020 | |
| CN | 206833160 U | 1/2018 | |
| EP | 1 635 232 A1 | 3/2006 | |
| EP | 2 431 825 A1 | 3/2012 | |
| EP | 3 206 092 A1 | 8/2017 | |
| IT | MI20 091 908 A1 | 5/2011 | |

(Continued)

OTHER PUBLICATIONS

Translation of CH 712115, Espacenet (Year: 2023).*

(Continued)

*Primary Examiner* — Renee S Luebke
*Assistant Examiner* — Matthew Hwang
(74) *Attorney, Agent, or Firm* — Sughrue Mion, PLLC

(57) ABSTRACT

A case (2) for a wristwatch (1) including: a middle part (4) including a wall (10) having two attachment areas (12) of the bracelet (24) disposed on either side of a plane (P) transverse to the middle part (4) substantially perpendicular to a back (20) of the case (2); two horns (6) capable of ensuring the complete attachment of the bracelet (24) to the middle part (4) by being connected to different ends of this bracelet (4), said horns (6) being removably and slidably attached to said attachment areas (12), and the back (20) attached to a mounting area (21) of the case (2) participating in blocking the horns (6) in translation in a direction of sliding (D) on the middle part (4) parallel to a central axis (A) of the case (2).

10 Claims, 3 Drawing Sheets

(56) References Cited

FOREIGN PATENT DOCUMENTS

JP 4-3379 U 1/1992

OTHER PUBLICATIONS

Translation of EP 2431825, Espacenet (Year: 2023).*
European Search Report for EP 20 00 0361 dated Feb. 15, 2021.
Communication dated Sep. 6, 2022, issued in Japanese Application No. 2021-150768.
Korean Office Action issued Mar. 22, 2024 in Application No. 10-2021-0130238.

* cited by examiner

WATCH WITH REMOVABLE HORNS

CROSS REFERENCE TO RELATED APPLICATION

This application claims priority to European Patent Application No. 20000361.4 filed Oct. 6, 2020, the entire contents of which are incorporated herein by reference.

TECHNICAL FIELD

The invention relates to a wristwatch case as well as such a wristwatch provided with this case.

PRIOR ART

It is known in the field of watchmaking to achieve the attachment of a bracelet to the middle part of a watch case from a spring bar. Such a bar conventionally includes a pin for attachment at each of its ends. In such a bar, the first pin is integrally mounted with a sliding piston in a tubular part and the second pin is in turn arranged in the other tubular part of this bar. In this configuration, the piston generally comprises a coil spring disposed in the tubular part in order to project the first pin out of the tubular housing.

However, one of the major drawbacks of such a bar is related to the fact that it requires, when attaching a bracelet to the middle part of a watch, the use of specific tools in order to bring in and maintain the piston in the tubular part. In addition, the use of such tools in this context requires the latter to be handled with precision and care so as not to damage the bracelet or the watch case.

It is therefore understood that the implementation of such an attachment is obviously not within everyone's reach.

DESCRIPTION OF THE INVENTION

The purpose of the invention is to overcome at least one of the disadvantages of the aforementioned prior art. More particularly, one of the purposes of the invention is to be able to mount/assemble horns, in particular made of plastic material, on a metal watch case, without welding and/or without gluing and/or without clipping.

Another purpose is to simplify the operations of mounting or even replacing a watch bracelet.

For this purpose, the invention relates to a wristwatch case comprising:

- a middle part including a wall having two attachment areas of the bracelet disposed on either side of a plane transverse to the middle part substantially perpendicular to a back of the case;
- two horns capable of ensuring the complete attachment of the bracelet to the middle part by being connected to different ends of this bracelet, said horns being removably and slidably attached to said attachment areas, and
- the back attached to a mounting area of the case participating in blocking the horns in translation in a direction of sliding on the middle part parallel to a central axis of the case.

In other embodiments:

- each attachment area comprises at least one groove extending perpendicularly relative to said back and each horn comprises at least one rib capable of sliding in said at least one groove;
- each attachment area comprises as many grooves as each horn comprises ribs, said ribs being capable of sliding in said grooves;
- the back of the case comprises an attachment part ensuring the blocking in translation of ribs in corresponding grooves;
- the grooves of each attachment area are disposed symmetrically on either side of a plane substantially orthogonal or orthogonal both to the transverse plane and to the back of the case;
- each groove is closed by a support portion;
- each rib comprises a recessed part intended to be in contact with a stop surface;
- each rib comprises at least one clamping element configured to cooperate with the groove wherein said rib is capable of being arranged by sliding;
- said at least one clamping element projects from a peripheral wall of each rib;
- the horns are blocked in translation in the direction of sliding on the middle part by the back and by the support portions of the grooves.

The invention also relates to a wristwatch comprising such a case.

Advantageously, in this wristwatch, the horns form a one-piece element with the bracelet.

Generally, the advantageous embodiments of each aspect of the invention are equally applicable to the other aspects of the invention. As far as possible, each aspect of the invention can be combined with other aspects. The aspects of the invention are also combinable with the embodiments of the description, which in addition are combinable with each other.

BRIEF DESCRIPTION OF THE FIGURES

Other features and advantages of the present invention will be better understood from the following description and figures.

DESCRIPTION OF EMBODIMENTS

Figure 1:
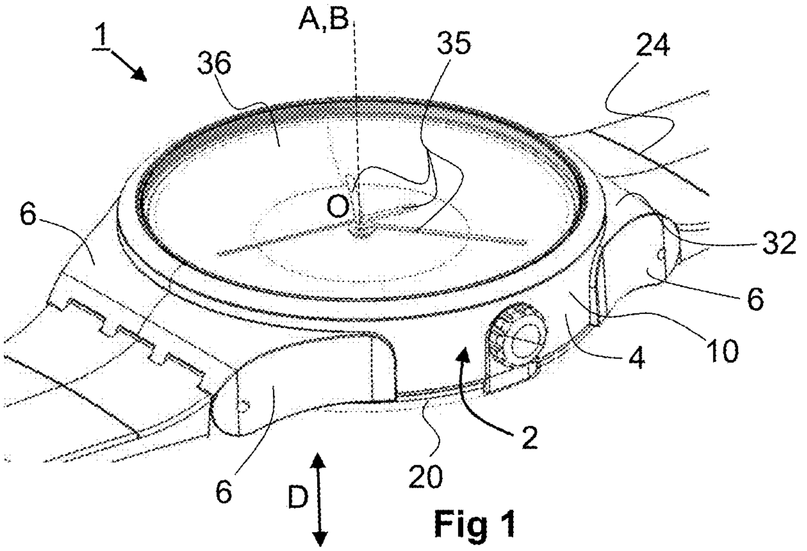
FIG. 1 shows a perspective view of a watch, according to one embodiment of the invention.
Figure 2:
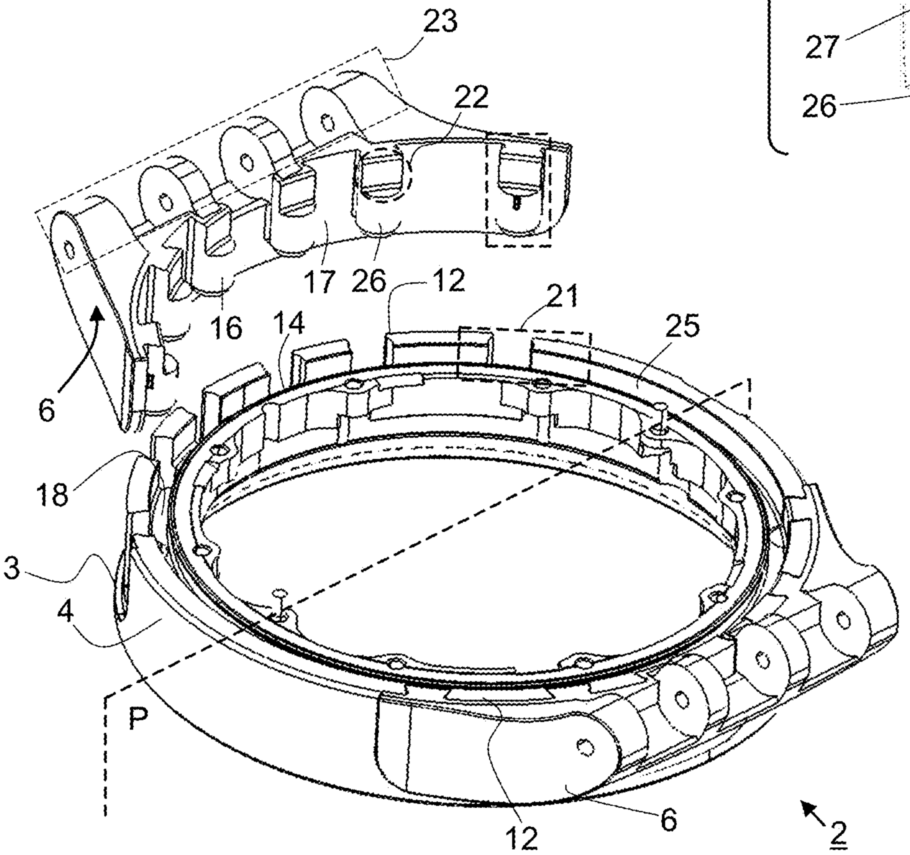
FIG. 2 illustrates a representation of a middle part of a watch case with a horn mounted on this middle part and another horn disassembled from the latter, according to the embodiment of the invention.

FIG. 1 shows a watch 1 provided with a watch case 2. This watch case 2 is in particular comprised in a wristwatch 1. Such a case 2 includes in particular a middle part 4, a back 20, two horns 6, a horological movement provided with a display module comprising for example a dial 36 and hands 35. The case 2 and in particular the middle part 4 has a transverse plane P substantially perpendicular or strictly perpendicular to the longitudinal direction of the bracelet 24. In other words, this transverse plane P is substantially parallel or strictly parallel to a central axis A of the case 2 or even comprises this central axis A. This central axis A passes through this case 2 at its centre O and coincides with an axis of rotation B of at least one of the hands 35 of the watch 1. Such a central axis A is substantially perpendicular or strictly perpendicular to the longitudinal direction of the bracelet 24. Such a central axis A is substantially perpendicular or strictly perpendicular to the dial 36 and/or to the back 20 of the case 2 in particular to an external face and/or an internal face of this back 20. This transverse plane P visible in FIG. 2, is a plane of symmetry of the middle part 4 and therefore of the case 2.

In this configuration, the two horns 6 are arranged symmetrically with respect to the transverse plane P, being opposite to each other when they are mounted on the case 2 and therefore on the middle part of this case 2. In other words, these two horns 6 are each a symmetry orthogonal to one another with respect to this transverse plane P.

These two horns 6 are provided to ensure the complete attachment of the bracelet 24 to the middle part 4. These horns 6 are intended to be attached to different ends of the bracelet 24. More precisely, the first horn 6 is intended to be attached to a first end of the bracelet 24 and the second horn to a second end of the bracelet 24. When the bracelet 24 comprises two strands, the first horn 6 is attached to the first strand and the second horn 6 to the second strand. Such a configuration is also a specific feature of the invention which allows to have a case 2 comprising only two horns 6 and not four horns as is conventionally the case in the prior art. Such a configuration contributes in particular to simplifying the operations of assembly and disassembly of the bracelet 24 on the case 2.

In FIGS. 1, 2, 4, 6 and 7, the middle part 4 preferably has a substantially cylindrical shape. This middle part 4 comprises a peripheral wall 10 comprising two attachment areas 12 each provided with a support portion 3, said areas 12 being disposed on either side of the transverse plane P. These first and second areas 12 are preferably arranged on the peripheral wall 10, symmetrically, while being diametrically opposite to each other. Such first and second attachment areas 12 are specifically provided to receive the first and second horns 6 of this watch 1 case 2. These attachment areas 12 which are visible in FIG. 2 have an essentially cylindrical arc shape, a shape which is capable of being matched by the horns 6. In addition, it will be noted that in these attachment areas 12, the support portion 3 is configured to cover a part of an upper face 32 of the horn 6 bearing on this said portion 3 when said horn 6 is mounted on the case 2. The support portions 3 of said areas 12 are each defined in the peripheral wall 10 near or even in an edge of the middle part 4 connecting an upper part of this middle part 4 capable of receiving a crystal of the case 2, to this peripheral wall 10. In this context, the lower part 25 of this middle part 4 is designed to receive the back of the case 2.

In this case 2, the first and second horns 6 are designed to be attached/mounted on either side of the middle part 4 on the attachment areas 12. As already mentioned, each horn 6 has a shape complementary to that of its attachment area 12 on the middle part 4. Such horns 6 are removably and slidably attached/mounted to the middle part 4. In other words, such horns 6 are attached/mounted to said fastening areas 12 to from a particular type of attachment here an attachment which is removable by sliding. Also such horns 6 are attached/mounted to said attachment areas 12 from a sliding attachment device also called a sliding mechanism. As will be seen below, each of these horns 6 is blocked in translation in a direction of sliding D on the middle part 4, directly or indirectly, in particular by the back 20 of this watch case 2. This direction D is substantially parallel or strictly parallel to the central axis A of the case 2 and is oriented in a direction indicating:

- the support portion 3 of the area 12 during assembly/mounting of the horn 6 of the case 2 and
- the back when disassembling/dismounting the horn 6 of the case 2.

Referring to FIGS. 2 to 6, the watch 1 case 2 comprises the sliding attachment device of each horn 6 on the middle part 4 of this case 2, the device essentially including:

- at least one groove 14, also called a "hole" or "cavity", comprised on/in each attachment area 12 of the middle part 4, and
- at least one rib 16, also called a "stud", comprised on the internal wall 17 of each horn 6.

It will be noted that said at least one groove 14 and said at least one rib 16 can each have a random shape. In addition, each groove 14 of the attachment area 12 is engraved/sculpted/traced in the peripheral wall of the middle part of the case 2.

It will be noted that this attachment device can also comprise in a complementary manner the back 20 and a blocking element 8 which will be described below. Such a device thus allows to achieve a removable attachment of the horns 6 on the middle part 4 of the case 2.

The attachment areas 12 can each comprise, by way of example: at least one pair of grooves 14 or at least one triplet of grooves 14 or at least one quadruplet of grooves 14.

Figure 4:
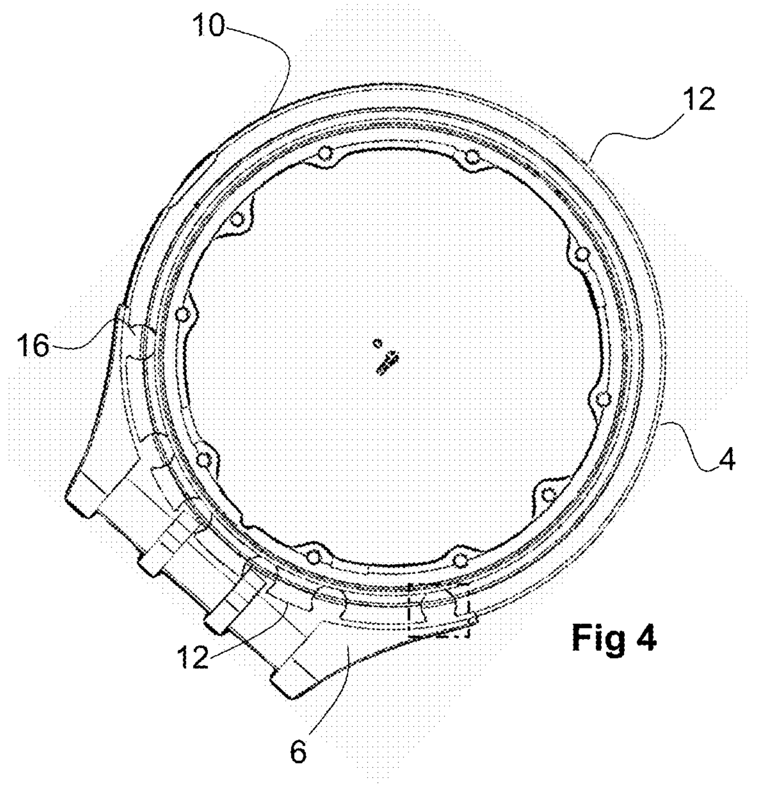
FIG. 4 illustrates a bottom view of the middle part provided with a single horn, according to the embodiment of the watch.
Figure 6:
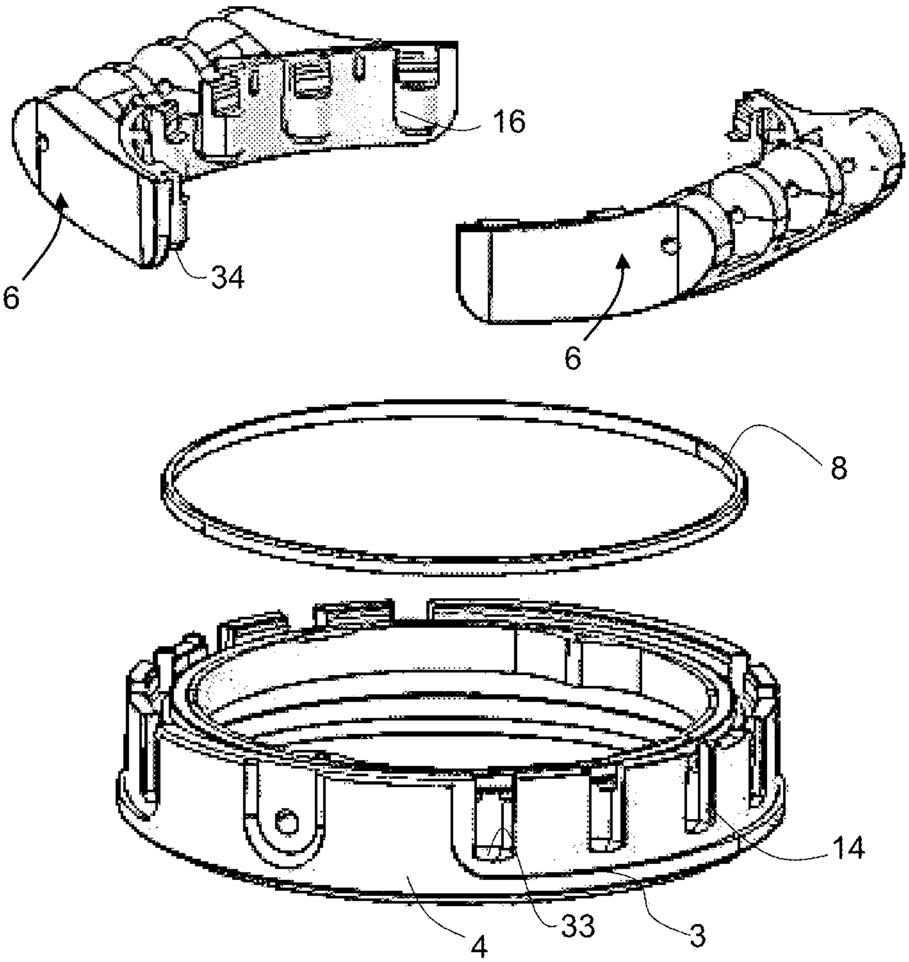
FIG. 6 shows an exploded view of the case wherein are visible some elements of this case such as the middle part, the two horns and an element for blocking said horns by the back according to the embodiment of the invention.
Figure 7:
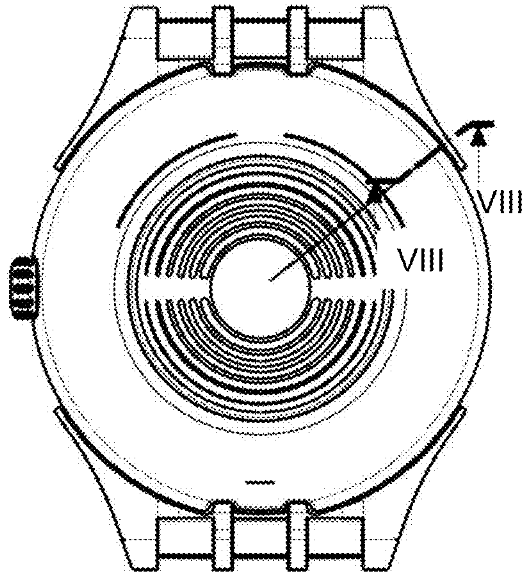
FIG. 7 is a bottom view of the watch case according to the embodiment of the invention.
Figure 8:
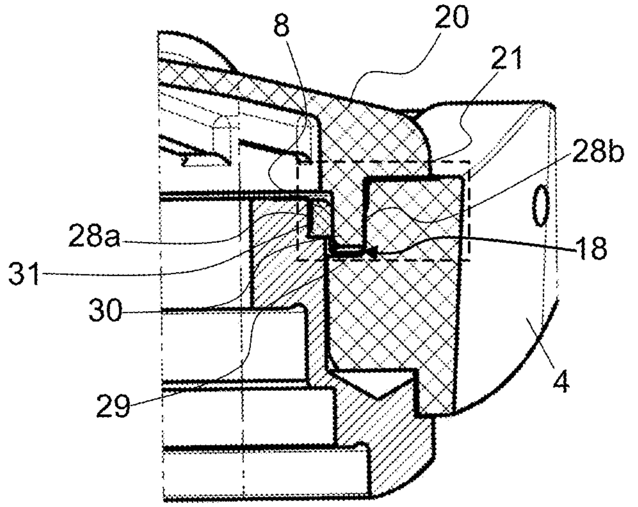
FIG. 8 is a view along the plane VIII-VIII of the case shown in FIG. 7.

In the embodiment illustrated in FIGS. 2,4 and 6, the first and second attachment areas 12 each comprise two triplets of grooves 14 or else three pairs of grooves 14, that is to say six grooves 14. In other words, when each attachment area 12 comprises these two triplets of grooves 14 or three pairs of grooves 14, the middle part 4 logically comprises twelve grooves formed on its wall 10. In this configuration, the six grooves 14 (either the two triplets of grooves 14 or the three pairs of grooves 14) located on the first attachment area 12 are disposed opposite the transverse plane P in a substantially symmetrical or symmetrical manner with respect to the six other grooves located on the second attachment area 12. Furthermore, on each attachment area 12, the grooves 14 of the first triplet and of the second triplet of grooves 14, can be disposed symmetrically on either side of a plane orthogonal to the transverse plane P with the first triplet on one side of this orthogonal plane and the second triplet on the other side of this plane. Likewise, the grooves 14 of the three pairs of grooves 14 are distributed symmetrically with respect to such a plane orthogonal to the transverse plane P with three grooves 14 disposed on each side of this orthogonal plane. It will be noted that this plane orthogonal to the transverse plane P is parallel to the longitudinal direction of the bracelet 24.

Moreover, it will be noted that each groove 14 is closed at one end by a support portion 33 and open at another end at a lower part 25 of the middle part 4. It will be noted that this support portion 33 forms the bottom of the groove 14.

In this configuration, the first and second horns 6 each include at least one pair of ribs 16 or at least one triplet of ribs 16. In FIGS. 2 and 4, these first and second horns 6 each comprise two triplets of ribs 16 or else three pairs of ribs 16, that is to say six ribs 16. It will be understood that each horn 6 is provided with as many ribs 16 as each attachment area 12 comprises grooves 14. In other words, the first and second horns 6 comprise a number of ribs 16 similar to the number of grooves 14 arranged on the first and second attachment areas 12 of the middle part 4. By way of example, when each horn 6 comprises a pair of ribs 16, each of these ribs 16 is disposed on the internal wall 17 of the horn 6 in order to slide in the groove 14 of the pair comprised in the corresponding attachment area 12. Such a horn 6 has an elongated arc shape allowing it to match that of the attachment area 12 of the middle part 4.

Figure 3:
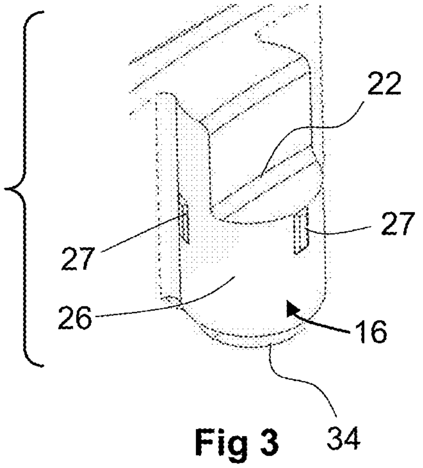
FIG. 3 shows a view on a larger scale of a rib of the horn of the watch illustrated in FIG. 2, according to the embodiment of the invention.
Figure 5:
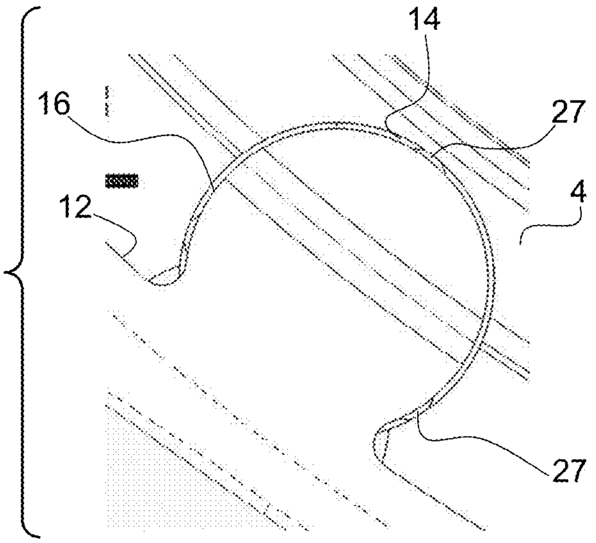
FIG. 5 shows a view on a larger scale of a rib of the horn illustrated in FIG. 4 which is comprised in a groove of the middle part, according to the embodiment of the invention.

These ribs 16 of each horn 6 each comprise two parts, an upper part 26 called "solid" part and a lower part 22 called "recessed" part. This recessed part 22 is in particular designed to cooperate directly or indirectly with the back 20 of the case 2. In this configuration, the back 20 can thus participate directly or indirectly in the blocking of the horns 6 in translation in the direction of sliding D on the middle part 4. Each rib 16 comprises at least one clamping element 27 able to cooperate with an internal face of the groove 14 wherein said rib 16 is capable of being arranged by sliding. Said at least one clamping element 27 allows to ensure axial retention of this rib 16 in the groove 14 and/or retention of this rib 16 in the groove 14. In other words, said at least one clamping element 27 contributes to eliminating any clearance between this rib 16 and this groove 14. Such a clamping element 27 projects from a peripheral wall of each rib 16. More specifically, this clamping element 27 is arranged on this peripheral wall of the rib 16 in particular on the portion of this wall which is located in the upper part 26 of this rib 16. In FIGS. 3 and 5, the rib 16 comprises three clamping elements 27. By way of example, this clamping element 27 may have the shape of a prism. In addition, the upper part 26 of this rib 16 comprises at its free end a support area 34 capable of bearing on the support portion 33 of the corresponding groove 14.

Referring to FIGS. 2 to 8, the case 2 comprises a mounting area 21 of the back 20 on the middle part 4 of this case 2. This mounting area 21 comprises in particular an annular cavity 18 or annular slot 18 provided to receive the back 20 of the case and the blocking element 8 for blocking this back 20 to the middle part 4. This cavity 18 comprises a bottom 29 and first and second peripheral walls 28*a*, 28*b*. The first and second peripheral walls 28*a*, 28*b* are preferably substantially opposite or strictly opposite to each other. This second wall 28*b* and this bottom 29 of the annular cavity 18 are both formed simultaneously by the lower part 25 of the middle part 4 and by the recessed part 22 of each rib 16 when the latter is slid into the corresponding groove 14. This cavity 18 is able to receive the blocking element 8 as well as an attachment part 30 integrally formed with the body of the back 20 of the watch case. In particular, it will be noted that this attachment part 30 projects from an internal face of this back 20 of the case, by extending in a direction oriented towards the bottom 29 of the annular cavity 18. In addition, this attachment part 30 also extends over the internal face of the back equidistant from the edge of this back 20 of the case. It will be noted that this attachment part 30 is specifically provided/configured to be arranged in the annular cavity 18. This attachment part 30 can be formed of a single element or of several elements.

In this cavity 18, the first peripheral wall 28*a* comprises a recess 31 provided for the arrangement of a part of the body of the blocking element 8 in this first wall 28*a*. This recess 31 may have a section in the shape of the letter "L". In this configuration, when the back 20 of the case is assembled to the middle part 4, the blocking element 8 is then able to exert a force on the attachment part 30 of this back 20 so as to maintain the back 20 of the case attached to this middle part 4. Thus, under the effect of the force exerted by this blocking element 8 of the case 2, this attachment part 30 is then able to cooperate mechanically with the recessed parts 22 of the ribs 16 in order to ensure the blocking in translation of the ribs 16 in the corresponding grooves 14 thus preventing these ribs 16 from sliding and/or coming out of these grooves 14. In other words, the back 20 which is attached at the mounting area 21 participates in the blocking of the horns 6 in translation, directly in the direction of sliding D, on the middle part 4.

It is therefore understood that the blocking element 8 which is visible in FIG. 6, may be a ring or an O-ring shaped seal or even an O-ring seal which may participate in the sealing of the case 2 as well as in the blocking/attachment of the back 20 on the middle part 4.

It will be noted that each rib 16 and in particular the recessed part 22 of the latter is capable of contacting a stop surface defined in a localised portion of the attachment part 30. In other words, this attachment part 30 comprises a portion defining the stop surface which is associated with each of the ribs 16. Advantageously, each rib 16 extends substantially perpendicular or perpendicularly with respect to this blocking element 8 and therefore to the back of the case 2.

Thus, it will be noted that each of these horns 6 is blocked in translation in the direction D of sliding on the middle part 4 by the back 20 and by the support portions 33 of the grooves 14. In addition, the support portions of the areas 12 can also participate in this blocking in translation.

Furthermore, in this watch case 2, it will be noted that the horns 6 each comprise an area 23 for attaching a strand of the bracelet 24. In an alternative, the horns 6 can form with the bracelet a one-piece element of the watch that is to say a one single piece of this watch.

Moreover, the middle part 4 can be made with a first material and the two horns 6 with a second material, the first material preferably being different from the second material. Alternatively, for some applications, the materials selected for the middle part 4 and the horns 6 may be the same. The first and/or the second material can be stainless steel (usually 316 L steel), gold, platinum, titanium, brass, ceramic, plastic, carbon, wood, silver, another metal, a metal alloy, or any combination thereof.

Advantageously, the middle part 4 and the horns 6 can respectively have (at least) coating layers. When the middle part 4 and the horns 6 respectively have coating layers whose composition is identical, the material of the middle part 4 may be different from that of the material of the two horns 6, in order to optimise the manufacturing costs and/or to optimise the resistance of the watch case 2. Each layer can be a metallic layer, a varnish or a pigmented layer, or any combination thereof.

The invention also relates to a wristwatch 1 comprising a watch case 2 including the features of this case 2 presented above.

While a particular embodiment has just been described in detail, the person skilled in the art will appreciate that various modifications and alternatives thereto may be considered in light of the overall teaching provided by the present description. Provision may in particular be made for the number of ribs 16 and therefore of grooves 14 and also their positioning to vary according to the desired configuration and in particular according to a configuration aiming for example at reducing the tensions induced in the material (s) constituting the watch 1 case 2. Consequently, the specific arrangements described herein are intended to be given as an illustration only, without the intention of limiting the scope of the invention.

The invention claimed is:

1. A watch case (2) for a wristwatch (1) comprising:

a middle part (4) including a wall (10) having two attachment areas (12) of a bracelet (24) disposed on either side of a plane (P) transverse to the middle part (4) and substantially perpendicular to a back (20) of the case (2);

two horns (6) capable of ensuring the complete attachment of the bracelet (24) to the middle part (4) by being connected to different ends of said bracelet (24), said horns (6) being removably and slidably attached to said attachment areas (12), and the back (20) attached to a mounting area (21) of the case (2) participating in blocking the horns (6) in translation in a direction of sliding (D) on the middle part (4) parallel to a central axis (A) of the case (2), wherein each attachment area (12) comprises as many grooves (14) as each horn (6) comprises ribs (16), said ribs (16) being capable of sliding in said grooves (14), and wherein each rib (16) comprises at least one clamping element (27) configured to cooperate with the groove (14) wherein said rib (16) is capable of being arranged by sliding.

2. The watch case (2) according to claim 1, wherein each attachment area (12) comprises at least one groove (14) extending perpendicularly relative to said back (20) and each horn (6) comprises at least one rib (16) capable of sliding in said at least one groove (14).

3. The watch case (2) according to claim 1, wherein the back (20) is provided with an attachment part (30) ensuring the blocking in translation of ribs (16) in corresponding grooves (14).

4. The watch case (2) according to claim 1, wherein the grooves (14) of each attachment area (12) are disposed symmetrically on either side of a plane substantially orthogonal or orthogonal both to the transverse plane (P) and to the back (20) of the case (2).

5. The watch case (2) according to claim 1, wherein each groove (14) is closed by a support portion (33).

6. The watch case (2) according to claim 1, wherein each rib (16) comprises a recessed part (22) intended to be in contact with a stop surface.

7. The watch case (2) according to claim 1, wherein said at least one clamping element (27) projects from a peripheral wall of each rib (16).

8. The watch case (2) according to claim 5, wherein the horns (6) are blocked in translation in the direction (D) of sliding on the middle part (4) by the back (20) and by the support portions (33) of the grooves (14).

9. A wristwatch comprising the case (2) according to claim 1.

10. The wristwatch according to claim 9, wherein the horns (6) form with the bracelet a one-piece element.

* * * * *